(12) United States Patent
Golander et al.

(10) Patent No.: US 10,606,803 B2
(45) Date of Patent: Mar. 31, 2020

(54) DATA CLONING IN MEMORY-BASED FILE SYSTEMS

(71) Applicant: PLEXISTOR LTD., Herzelia (IL)

(72) Inventors: Amit Golander, Tel Aviv (IL); Sagi Manole, Petah Tikva (IL); Boaz Harrosh, Herzelia (IL)

(73) Assignee: NETAPP, INC., Sunnyvale, CA (US)

( * ) Notice: Subject to any disclaimer, the term of this patent is extended or adjusted under 35 U.S.C. 154(b) by 286 days.

(21) Appl. No.: 15/630,392

(22) Filed: Jun. 22, 2017

(65) Prior Publication Data

US 2017/0371889 A1 Dec. 28, 2017

Related U.S. Application Data

(60) Provisional application No. 62/355,373, filed on Jun. 28, 2016.

(51) Int. Cl.
*G06F 16/30* (2019.01)
*G06F 16/13* (2019.01)
*G06F 16/178* (2019.01)
*G06F 16/27* (2019.01)
*G06F 16/22* (2019.01)
*G06F 16/901* (2019.01)
*G06F 3/06* (2006.01)

(52) U.S. Cl.
CPC ............ *G06F 16/13* (2019.01); *G06F 3/065* (2013.01); *G06F 3/0619* (2013.01); *G06F 3/0679* (2013.01); *G06F 16/178* (2019.01); *G06F 16/2246* (2019.01); *G06F 16/275* (2019.01); *G06F 16/9024* (2019.01)

(58) Field of Classification Search
CPC ............ G06F 16/1865; G06F 16/2246; G06F 16/275; G06F 16/9024; G06F 16/178; G06F 16/13
USPC ........ 707/607, 687, 705, 769, 790, 813, 821
See application file for complete search history.

(56) References Cited

U.S. PATENT DOCUMENTS

| | | | |
|---|---|---|---|
| 9,460,177 B1 * | 10/2016 | Pawar | ................. G06F 16/1865 |
| 10,216,757 B1 | 2/2019 | Armangau et al. | |
| 2005/0065986 A1 | 3/2005 | Bixby et al. | |
| 2012/0130949 A1 | 5/2012 | Picken et al. | |

(Continued)

OTHER PUBLICATIONS

Non-Final Office Action on co-pending U.S. Appl. No. 15/630,453 dated May 15, 2019.

(Continued)

*Primary Examiner* — Sana A Al-Hashemi
(74) *Attorney, Agent, or Firm* — Klein, O'Neill & Singh, LLP (57) ABSTRACT

Method, apparatus and product for data cloning in a memory-based file systems. A content of each object of the file system is retained in data units and represented using a tree of the nodes comprising tree nodes and leaf nodes. The file system utilizes a volatile resource usage collection and volatile reference counters for each node of the nodes. In response to mounting the file system, a storage retaining a file system metadata is scanned to compile the volatile resource usage collection and the volatile reference counters. In response to a determination to reuse a pointed node of a tree of an object by a pointing node, a volatile reference counter of the pointed node is updated and the pointing node is atomically set, using a single instruction, to point to the pointed node.

20 Claims, 7 Drawing Sheets

(56) References Cited

U.S. PATENT DOCUMENTS

| | | |
|---|---|---|
| 2016/0328488 A1* | 11/2016 | Lytle .................. G06F 9/54 |
| 2016/0350006 A1 | 12/2016 | Wang et al. |
| 2016/0350325 A1 | 12/2016 | Wang et al. |
| 2017/0060898 A1 | 3/2017 | Lu et al. |
| 2017/0371912 A1 | 12/2017 | Kimura |

OTHER PUBLICATIONS

Final Office Action on co-pending U.S. Appl. No. 15/630,453 dated Dec. 2, 2019.

* cited by examiner

DATA CLONING IN MEMORY-BASED FILE SYSTEMS

CROSS-REFERENCE TO RELATED APPLICATION

This application claims the benefit of U.S. Provisional Application No. 62/355,373 filed Jun. 28, 2016, entitled Efficient Copy-on-Write in memory-based file system, which is hereby incorporated by reference in its entirety without giving rise to disavowment.

TECHNICAL FIELD

The present disclosure relates to data cloning in file systems in general, and to efficient data cloning in memory-based file systems, in particular.

BACKGROUND

File storage is traditionally implemented as non-volatile block-based storage media such as magnetic hard-disk drive (HDD), Flash-based solid-state drive (SSD) or Flash-based non-volatile memory SSD (NVMe), and employed as a peripheral device to one or more computing devices. Such technologies provide affordable capacity, but at latency longer in many orders of magnitudes as compared to the latency of volatile memory such as dynamic random-access memory (DRAM).

Newly developed storage media technologies are currently becoming available, which overcome this problem. For example, a Non-Volatile Dual In-line Memory Module (NVDIMM) is a computer random access memory (RAM) that retains data even when electrical power is stopped due to normal system shutdown, an unexpected power loss, system crash or any other reason. Currently the main type of available NVDIMM cards include: NVDIMM-N which is a byte-addressable memory-mapped device, typically comprised of capacitor or battery backed DRAM and responds at memory speeds. Several storage-class memory-based NVDIMMs are planned to reach the market around 2018, these for example include MRAM, 3DXPoint and ReRAM based NVDIMMs planned by vendors such as Everspin™, Intel™, Western Digital™ and Sony™.

Traditional file systems and storage solutions rely on a block Application Program Interface (API). Emerging NVDIMMs technologies are faster, but their impact can extend to changing the mode of operation. Their byte addressability further opens an opportunity to optimize the entire algorithm, not just run the same ones faster.

Light-weight clones and Copy-on-write (CoW) is a technique that may be used to implement clones, snapshots, backup, disaster recovery, de-duplication, cloud offload and other features. CoW is a space and time efficiency optimization strategy that takes advantage of the fact that it is not necessary to immediately create a new copy of that information. Instead, a link to the same data is created, with the provision that on the first occasion in which one of the logical copies needs to be modified, space for the different copy is allocated and modified on demand. When there are many separate processes all using the same large data structure, each with a small likelihood of having to modify it at all, or to modify only a small part of it, then it is possible to make significant resource savings by sharing physical space across logical copies.

BRIEF SUMMARY

One exemplary embodiment of the disclosed subject matter is a computer program product comprising a non-transitory computer readable storage medium retaining program instructions for implementing a file system, wherein a content of each object of the file system is retained in data units, wherein the object is represented using a tree of the nodes comprising tree nodes and leaf nodes, wherein each tree node points to at least one node, wherein each leaf node of at least a portion of the leaf nodes points to at least one data unit used to retain content of the each object; wherein the file system utilizes a volatile resource usage collection and volatile reference counters for each node of the nodes; wherein said program instructions when read by a processor, cause the processor to perform: in response to mounting the file system, scanning a storage retaining a file system metadata to compile the volatile resource usage collection and the volatile reference counters; and in response to a determination to reuse a pointed node of a tree of an object by a pointing node: updating a volatile reference counter of the pointed node; and atomically setting, using a single instruction, the pointing node to point to the pointed node.

Optionally, said atomically setting is performed without employing a locking mechanism.

Optionally, said atomically setting is performed without using a transaction log.

Optionally, at least a portion of the data units are memory pages retained in a Byte-addressable persistent memory.

Optionally, the file system is a multi-tier file system comprising a first tier and a second tier, wherein the first tier is retained in the Byte-addressable persistent memory, wherein the second tier is a different storage other than the Byte-addressable persistent memory.

Optionally, the volatile resource usage collection comprises a list of data units associated with the file system that are unallocated.

Optionally, the volatile resource usage collection comprises a list of data units associated with the file system that are allocated.

Optionally, said program instructions when read by the processor, cause the processor to perform, in response to an instruction to modify a content of a second object: computing a path in the tree of the second object to update the content; identifying a second pointed node in the path having a volatile reference counter with a value greater than one, wherein a second pointing node is pointing to the second pointed node, whereby identifying a sub-tree rooted at the second pointed; creating a clone sub-tree of the sub-tree; atomically modifying, using a single instruction, the second pointing node to point to a first node of the clone sub-tree instead of pointing to the second pointed node; and updating the volatile reference counter of the second pointed node to decrease the value by one.

Optionally, the tree of nodes is an inode data structure.

Optionally, said updating the volatile reference counter and said atomically setting the pointing node are not performed together in an atomic manner.

Another exemplary embodiment of the disclosed subject matter is an apparatus comprising: a persistent storage retaining data units used by a file system, wherein a content of each object of the file system is retained in the data units, wherein the each object is represented using a tree of nodes comprising tree nodes and leaf nodes, wherein each tree node points to at least one node, wherein each leaf node of at least a portion of the leaf nodes points to a data unit used to retain content of the each object; wherein said persistent storage comprising a Byte-addressable persistent memory, wherein said Byte-addressable persistent memory is configured to retain at least a portion of the data units used by the file system, wherein said Byte-addressable persistent memory retaining the nodes; a processor, wherein said processor is configured to scan said Byte-addressable persistent memory to compile a volatile resource usage collection and volatile reference counters of the nodes; wherein said processor is configured, in response to a determination to reuse a pointed node of a tree of an object by a pointing node, to: update a volatile reference counter of the pointed node; and atomically set, by a single instruction, the pointing node to point to the pointed node.

Optionally, said atomically setting and said updating are performed without employing a locking mechanism.

Optionally, atomically setting and said updating are performed without using a transaction log.

Optionally, said atomically setting is performed using a single atomic instruction in an instruction set of said processor.

Optionally, said persistent storage consisting said Byte-addressable persistent memory.

Optionally, said persistent storage comprises a second storage device, wherein the file system is a multi-tier file system comprising a first tier and a second tier, wherein the first tier is retained in said Byte-addressable persistent memory, wherein the second tier is retained in said second storage device.

Optionally, said second storage device is a block-based storage device.

Optionally, the volatile resource usage collection comprises a list of data units or nodes associated with the file system that are unallocated.

Optionally, the volatile resource usage collection comprises a list of data units or nodes associated with the file system that are allocated.

Optionally, said processor is configured, in response to an instruction to modify a content of a second object, to: compute a path in the tree of the second object to update the content; identify a second pointed node in the path having a volatile reference counter with a value greater than one, wherein a second pointing node is pointing to the second pointed node, whereby a sub-tree rooted at the second pointed is identified; create a clone sub-tree of the sub-tree; atomically modify, using a single instruction, the second pointing node to point to a first node of the clone sub-tree instead of pointing to the second pointed node; and update the volatile reference counter of the second pointed node to decrease the value by one.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem addressed by the disclosed subject matter is to provide for efficient data cloning in a file system that utilizes persistent memory. In some exemplary embodiments, the data cloning system may provide space efficiency by allowing an original copy and clone thereof, to share common data units. Additionally or alternatively, the data cloning system may provide an efficient copy mechanism where the creation of a clone from an original copy is relatively fast and with little overhead. Additionally or alternatively, the cloning system should support cloning an original copy a plurality of times, and as many times needed. Additionally or alternatively, the cloning system may support the possibility of creating a clone of a clone.

In some exemplary embodiments, memory-based file systems may retain data in pages. The pages can be accessed at lower granularity than blocks, such as using addressable memory space (e.g., byte-addressable) and providing random access to the memory page, instead of requiring block-based access, such as to blocks of 4 KBs.

It will be understood that the term byte-addressable is not to be construed as limited to only address spaces that are capable of being accessing at exactly one Byte granularity, but may also include address spaces using different granularity such as Word granularity, 2 B granularity, or the like. In some exemplary embodiments, the granularity may be less than or equal to a size of a processor cache line. Additionally or alternatively, the byte-addressable memory differs from block-addressable storage, which allows access at a block granularity, which is in orders of magnitude larger than the granularity of the byte-addressable memory (e.g., 4 KBs v. 64 B).

One technical solution may be to utilize an atomic instruction to update a pointer used by the file system to represent object.

In some cases, an object of the file system may be represented using a tree data structure, such as an inode. The tree data structure may comprise tree nodes and leaf nodes. The leaf nodes may point to a data unit retaining content of the object, while tree nodes point to nodes (either tree nodes or leaf nodes), thereby providing access to the data units used to retain the content of the object.

It will be noted that although the disclosure refers to a tree data structure, in case of de-duped content within the same object, the tree data structure may actually be a Directed Acyclic Graph (DAG), as the same node may be used twice in the same "tree".

Each tree node may be associated with a reference counter that counts a number of pointer pointing to the sub-tree rooted at the tree node is used. Upon attempting to modify content of a shared sub-tree, a clone of a portion of the shared sub-tree is created for the modified copy, and the modification is implemented only for the copy without affecting the non-modified instances.

In some exemplary embodiments, efficient operation may be implemented by using a single atomic instruction, instead of multi-instruction transactions. Such may be possible in case the tree nodes are retained in a memory space, such as in the byte-addressable persistent memory.

File systems employ metadata information. The metadata include reference counters for nodes counting the number of separate usages thereof. The metadata may also include a resource usage collection. The resource usage collection may indicate which resources, such as data units or nodes, are allocated and which are free to be used without overwriting existing content or disrupting the integrity of the file system. The resource usage collection may comprise a list of all unallocated data units, indicating which data units are free to be used. Additionally or alternatively, the resource usage collection may comprise a list of all allocated data units, indicating implicitly that each data unit not in the list, can be allocated and used. Additionally or alternatively, the resource usage collection may comprise lists of allocated or free nodes that can be used in the tree data structure. Additionally or alternatively, the resource usage collection may retain additional metadata and usage information regarding each resource in addition to whether or not it is currently being used to retain content or represent an object.

In some exemplary embodiments, the file system may use volatile metadata information, such as volatile reference counters and a volatile resource collection. The volatile metadata information is not guaranteed to be retained from one execution to the other. In some exemplary embodiments, the volatile metadata information may be retained in volatile memory, in persistent memory, or the like. In some exemplary embodiments, the volatile metadata information may be re-computed on each mounting of the file system. As a result, if the execution of an operation is interrupted in the middle, such as due to the computer shutting down, there may not be any adverse ramifications if the metadata information was not timely updated before the interruption.

In some exemplary embodiments, the nodes of the tree data structure used to represent objects of the file system may be retained on addressable memory, such as persistent memory. In such a case, speedy scanning of the data structures may be possible, and therefore the re-creation of the volatile metadata information, including the volatile reference counters and the volatile resource usage collection, may be relatively efficient and speedy. The same cannot be said with respect to data structures retained on block-based storage devices, such as HDDs, where re-compilation of the data units usage collection and traversal of the tree data structures that are retained in block-addressable storage devices may be inefficient and require a substantial amount of time due to the slow access time to the data blocks.

In some exemplary embodiments, as the metadata information is volatile, during updating of tree data structure, no transaction or locking is required to avoid corruption of the file system. On CoW operation, a pre-processing stage may be performed to create a clone of a tree/sub-tree in a volatile manner. During the pre-processing, the clone is not pointed to by any part of the persistent tree data structure. If the operation is interrupted in the middle, all effects of such pre-processing (e.g., changes in reference counters, allocations of data units and nodes) would be dropped without risking the integrity of the file system. Once the pre-processing is completed, a single operation is performed in an atomic manner, to implement the change. After such operation is completed, the change would persist even if the operation is interrupted. Post-processing may be performed to modify the volatile metadata information. However, if the post-processing is not completed and is interrupted, as the volatile metadata information is re-computed at the mounting of the file system, the consistency of the file system is unaffected.

As would be apparent to a person of ordinary skill in the art in view of the present disclosure, the fast and efficient access of the addressable persistent memory may be leveraged to reduce overhead of common operations (e.g., creation of clone, modification of an instance) which is associated with the need to handle corner cases (e.g., maintaining file system consistency during unexpected shutdown).

One technical effect of utilizing the disclosed subject matter is an efficient file system with reduced overhead compared to what is known in the art.

Applicant has implemented an embodiment of the disclosed subject matter and has demonstrated a significant speedup. Cloning of a 8 KB file was performed at 0.8 milliseconds on Applicant's embodiment, compared to 89.3 milliseconds on a first benchmark configuration using Linux XFS™ on a Non-Volatile Memory Express™ (NVMe™) and compared to 275.3 milliseconds on a second benchmark configuration using B-tree file System™ (Linux BTRFS™) on an NVMe™. Hence, the embodiment exhibited 105× speedup. Cloning of 1 GB file exhibited 16,000× speedup, where the embodiment required 0.8 milliseconds compared to 13,582 milliseconds on the first benchmark configuration and 15,403 milliseconds on the second benchmark configuration.

Figure 1:
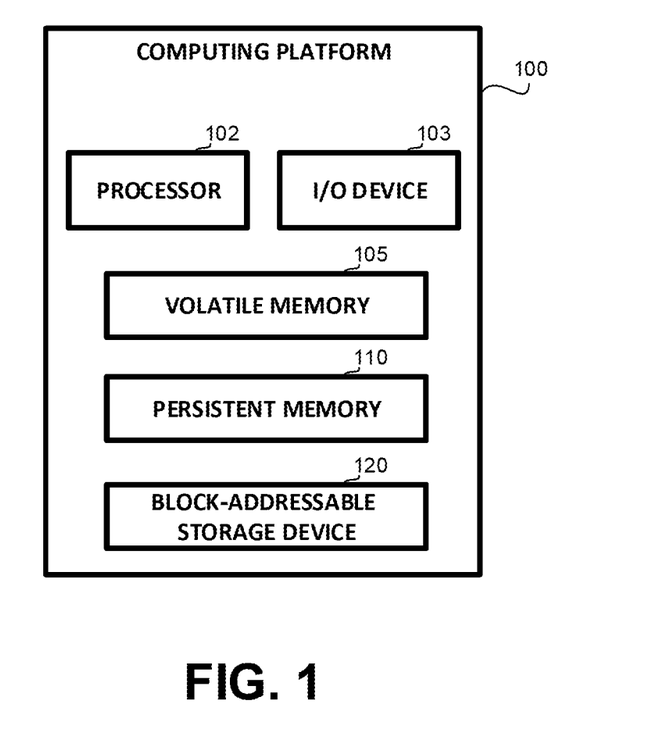
FIG. 1 shows a schematic block diagram of a computing platform, in accordance with some exemplary embodiments of the disclosed subject matter.

Referring now to FIG. 1, showing a schematic block diagram of a computing platform, in accordance with some exemplary embodiments of the disclosed subject matter.

Computing Platform 100 comprises Processor 102 which may be a Central Processing Unit (CPU), a microprocessor, an electronic circuit, an Integrated Circuit (IC) or the like. Processor 102 may be utilized to perform computations required by Computing Platform 100 or any of it subcomponents.

In some exemplary embodiments of the disclosed subject matter, Computing Platform 100 may comprise an Input/Output (I/O) Device 103. I/O Device 103 may be utilized to provide output to and receive input from a user. I/O Device 103 may be a peripheral device connected to computing platform 100, such as a keyboard, a speaker, a microphone, a display, or the like. In some exemplary embodiments, I/O Device 103 may be accessed via a bus, may be accessed as a peripheral device of Computing Platform 100, may be accessed over a network connection, or the like.

Computing Platform 100 may comprise Volatile Memory 105, such as Random Access Memory, cache memory, combination thereof, or the like, which may be used during execution of one or more programs. Volatile Memory 105 may be byte-addressable. In some exemplary embodiments, Volatile Memory 105 may be accessed via a bus, may be accessed as a peripheral device of Computing Platform 100, may be accessed over a network connection, or the like.

Additionally or alternatively, computing platform 100 may be associated with persistent storage which may or may not be comprised directly by Computing Platform 100. In some exemplary embodiments, the persistent storage may be accessed via a bus, may be accessed as a peripheral device of Computing Platform 100, may be accessed over a network connection, or the like. The persistent storage may be a non-volatile computer-useable medium used for long-term data storage such as a hard disk drive (HDD), a solid-state disk drive (SSD), a PCIe-attached Flash drive (NVMe SSD), or the like. Persistent storage may be implemented using a Persistent Memory 110 and optionally also using a Block-Addressable Storage Device 120. Persistent Memory 110 may be byte-addressable memory, such as, for example, non-volatile DIMM (NVDIMM) card or brick over a network, such as silicon photonics, PCI express (PCIe), Infiniband, or the like. In some exemplary embodiments, Persistent Memory 110 may reside on the memory interconnect and respond in near-memory speed, which may be orders of magnitude faster than Flash-based drives. Persistent Memory 110 may be used for long-term storage, such as by retaining a file system comprising one or more files. In some exemplary embodiments, Persistent Memory 110 may be configured to provide direct random access to Processor 102 using machine-level instructions, such as loads and stores, directed at the addressable space.

In some exemplary embodiments, Persistent Memory 110 may be used to retain the data structures used by the file system, such as the tree data structures representing the objects of the file system. Nodes of the tree data structures may be retained on Persistent Memory 110. In some exemplary embodiments, because the tree data structures are retained in Persistent Memory 110, they may be accessed quickly and efficiently. All the tree data structures in the file system may be traversed during mount to compute the resource usage collection by identifying the nodes and data units that are used in the tree data structures. During such traversal, reference counters for each node may be computed. As a result, the volatile metadata information may be computed, and there's no reliance on retained information which may be corrupted due to an incomplete operation.

In some exemplary embodiments, data units used to retain content of file system objects, such as files, directories, or the like, may be retained in Persistent Memory 110, Block-Addressable Storage Device 120, or on both. In some exemplary embodiments, the file system may be a multi-tier file system using a plurality of tiers to retain information. In some exemplary embodiments, the multi-tier file system may use Persistent Memory 110 as a first tier and Block-Addressable Storage Device 120 as a second tier. Additionally or alternatively, both the first tier and the second tier may be implemented using different persistent memory devices, such as devices differing in their costs and performances. In some exemplary embodiments, the first tier may be more expensive per given capacity but faster than the second tier. In some exemplary embodiments, accessing the first tier may be performed directly, while bypassing software caches, such as Linux™ page cache. In some exemplary embodiments, valid data unit content could be in memory tier (e.g. t1), in block-based tier (e.g., t2), or in both concurrently.

Figure 2A:
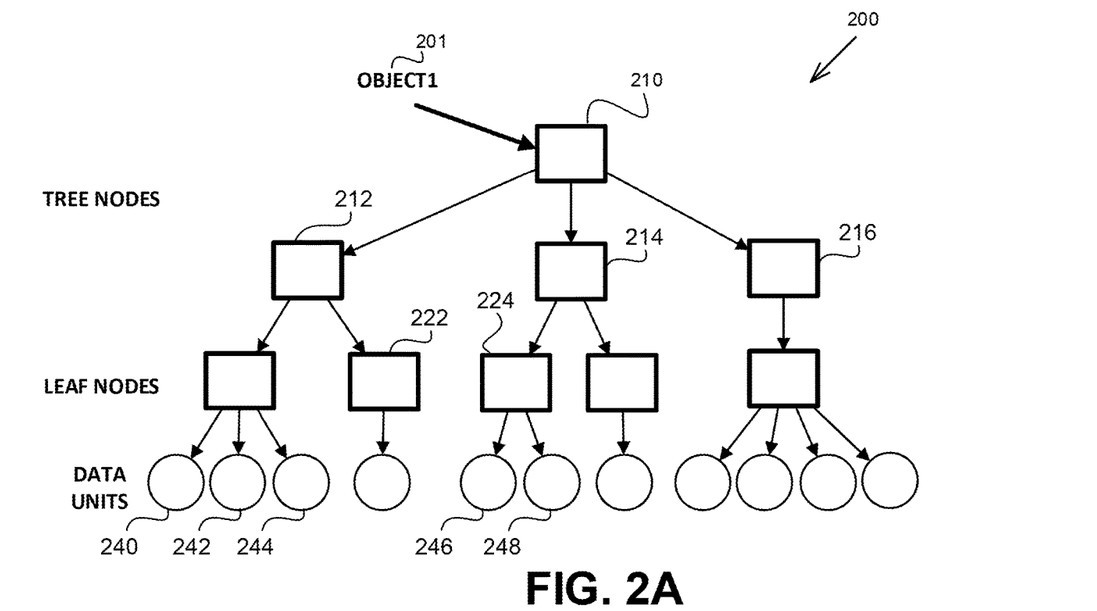
FIGS. 2A-2D show schematic illustration of a data structure used to represent an object, in accordance with some exemplary embodiment of the disclosed subject matter.

Referring now to FIG. 2A, showing a schematic illustration of a data structure used to represent an object, in accordance with some exemplary embodiment of the disclosed subject matter.

Object 1 201 is represented using a Tree Data Structure 200, such as inode used in Linux™. Tree Data Structure 200 comprises nodes. Tree nodes, such as 210, 212, 214, 216 are nodes pointing to other nodes in Tree Data Structure 200. Leaf nodes, such as 222, 224 are nodes at the lowest level of Tree Data Structure 200 and they point to data units which retain the data representing the content of Object 1 201. Data units, such as 240, 242, 244, 246, 248, may be pages retained in persistent memory (e.g., 110 of FIG. 1). Additionally or alternatively, the data units may be blocks in a block-based storage device (e.g., 120 of FIG. 1). In some exemplary embodiments, data units may be retained in different tiers.

In some exemplary embodiments, Tree Data Structure 200 may be retained in a memory, such as persistent memory 110 of FIG. 1, enabling efficient and fast access thereto.

Figure 2B:
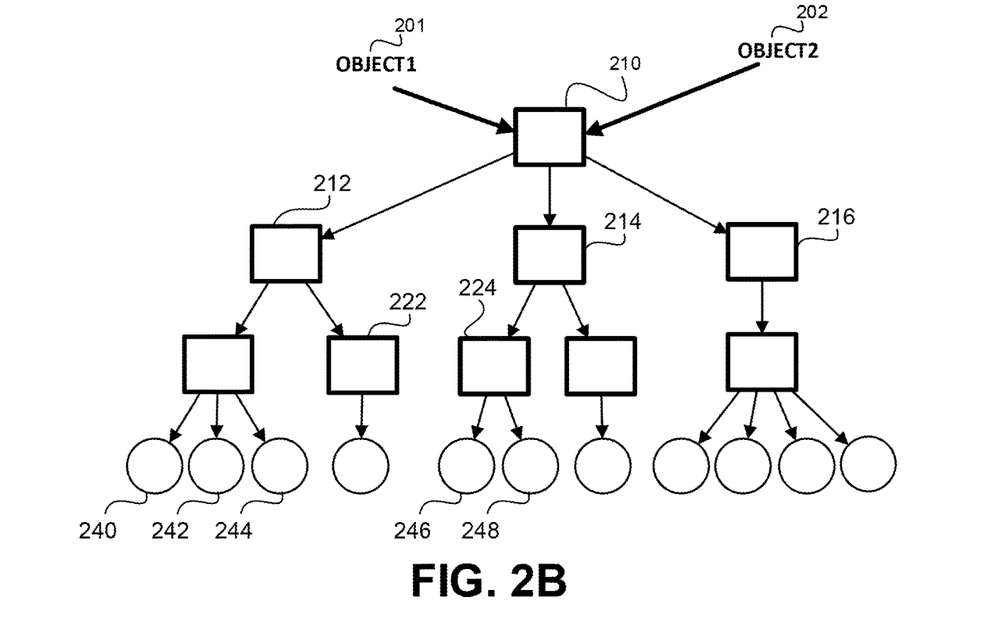

Assuming a light-weight clone of Object 1 201 is to be created without any modifications, Object 2 202 may utilize the same Tree Data Structure 200 of Object 1 201. Object 2 202 points to Root Node 210 of Tree Data Structure 200. A reference counter (RC) in or associated with Root Node 210 may be updated to indicate a number of objects in which the root node and the tree defined thereby are used. The setting of the pointer may be performed using an atomic instruction. In case an object (e.g., Object 1 201 or Object 2 202) is deleted, the reference counter is decreased by one. When the reference counter reaches zero, the Root Node 210 may be deleted and freed. Reference counters of the pointed nodes to which Root Node 210 points are accordingly reduced and potentially deleted if the counter reaches zero, and so forth and so on per deleted node.

In some exemplary embodiments, the reference counter is maintained in memory. In some exemplary embodiments, the reference counter is updated in a section potentially subject to a race condition, without using a lock, and not inside a transaction.

Figure 2C:
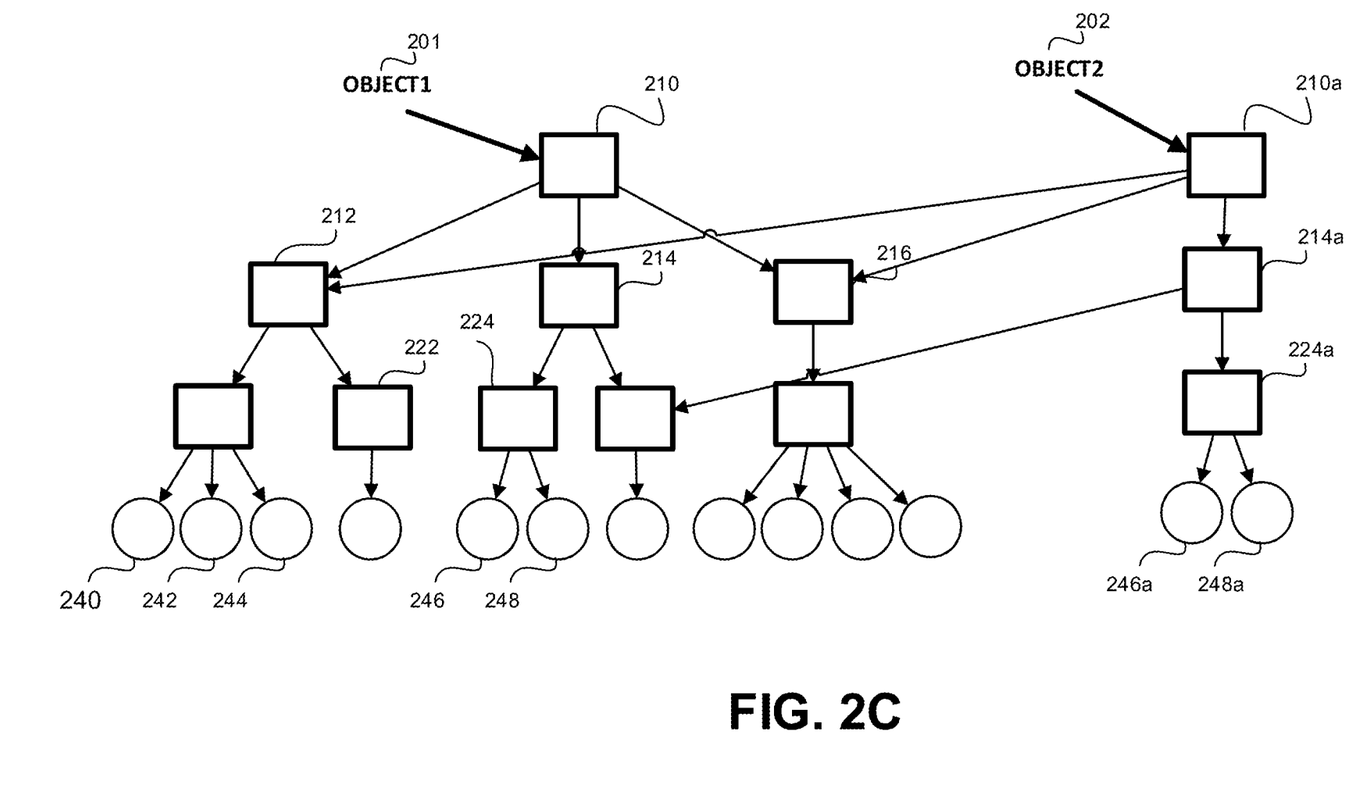

In response to a modification of Object 2 202, Copy on Write is implemented. In the illustrated example, the write request (e.g., through a write command (e.g., system call) to the file system, or via a store machine—level instruction to a memory mapped page (e.g., via the mmap system call) is assumed to affect data units 246 and 248. The file system may traverse the tree data structure representing Object 2 202, starting from Root Node 210 to the intermediate nodes and leaf. During the traversal, all reference counters are checked to validate that they all hold the value of one (i.e. unique owner). On the first reference counter that has a value larger than one, a decouple action is initiated. The file system separates the modified subset object (Object 2 202) from subsets of other instances (in this example, Object 1 201). FIG. 2C shows an outcome of such decouple operation. As Root Node 210 had a reference counter of 2, it is the first that needs to be duplicated. Object 2 202 now refers to a new Root Node 210a. The path reaching the affected data units (210, 214, 224) is replaced by a replica path (210a, 214a, 224a). The Root Node 210a may also point to nodes used by Object 1 201, which are unaffected by the modification (Nodes 212, 216). The reference counters of such unaffected nodes are increased accordingly. Modified content of data units 246, 248 is retained within alternative data units 246a, 248a, which are pointed to be the new Leaf Node 224a.

In some exemplary embodiments, the file system may prepare the sub-tree rooted at Node 210a as part of a pre-processing stage. New nodes may be allocated to be used as Nodes 210a, 214a, 224a. New data units may be allocated to be used as Data Units 246a, 248a. The allocation may be based on the volatile resource usage collection. The pointers of the newly allocated nodes that are used in the replica path are set accordingly. In some cases, if a node of the replica path is to be point to an existing node, such two operations may be implemented using two instructions in a non-atomic manner, and in a section potentially subject to race condition. The reference counter may be incremented first before setting the pointer itself. For example, Node 210a needs to point to Node 216. First an instruction to increase the reference counter of Node 216 is implemented, and only thereafter the pointer of Node 210a is set to Node 216. Such order of operation may guarantee that even if a race condition occurs, and the reference counter of Node 216 is deleted before the operation is completed (e.g., because Object 1 201 is deleted), Node 216 would not be released and the pointer from Node 210*a* would not point to a defunct node.

After the sub-tree rooted at Node 210*a* is prepared, the pointer of Object 2 202 is modified to point to Node 210*a* instead of Node 210, using an atomic operation. After the atomic operation, such as a single atomic instruction, is performed, the change implemented in the file system is persistent. If the operation is interrupted before the atomic instruction—the file system, if mounted again, would show the state as depicted in FIG. 2B.

After the pointer is modified, volatile metadata information may be updated according to the change. In some exemplary embodiments, volatile reference counters may be decreased. In this example, the volatile reference counter of Node 210 may be decreased by one as Object 2 02 no longer points to it.

As can be appreciated, internal nodes of Tree Data Structure 200 are re-used to represent Object 2 202, thereby reducing the overhead of having duplicate objects with little difference there between. The number of additional metadata and data added to also provide a tree data structure representing Object 2 202 is relatively small compared to those used in the tree data structure 200 representing Object 1 201, as most of the metadata and data is not copied. Avoiding copying the data also saves time and space.

Figure 2D:
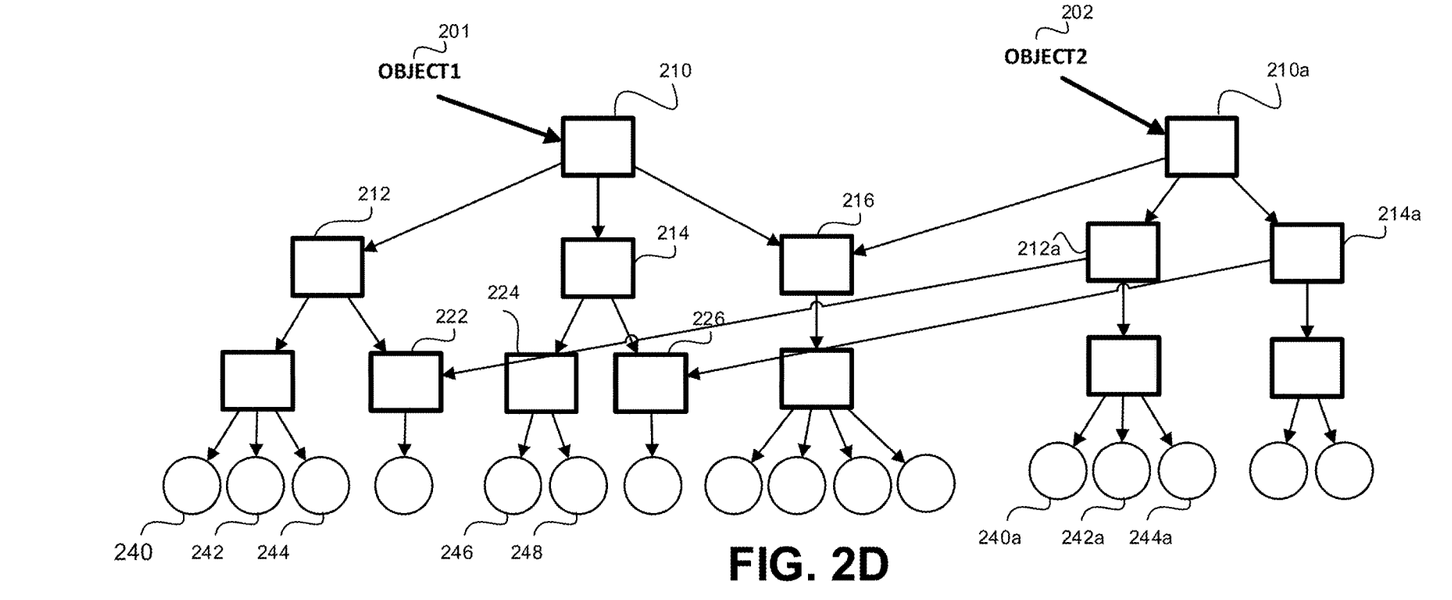

If another modification request is requested to Object 2 202, for example in an offset translated to Data Unit 244, then Node 210*a* acting as a root node for Object 2 202 may be modified, as is exhibited in FIG. 2D. After the modification, the metadata in the tree representing Object 2 202 comprises all the paths from the modified data to the root node (e.g., including path from root node 210*a* to 244*a*). The rest (e.g. the intermediate node 216, 222 and 226) is still shared.

In some exemplary embodiments, the sub-tree rooted at Node 212*a* is prepared in advance in pre-processing, and then the pointer from Node 210*a* is modified, using an atomic operation, to point to Node 212*a* instead of to Node 212. After the modification, the volatile reference counter of Node 212 may be decreased by one.

In some exemplary embodiments, all the data units pointed to be a leaf node may be copied together even if just one is modified. Additionally or alternatively, only the data units that are actually modified are copied while reusing unmodified sibling data units. In such a case, a reference counter may be implemented for the data units either implicitly or explicitly.

In some exemplary embodiments, the pointers used to point to nodes in the tree data structures may be limited to atomic boundaries. For example, the pointer may be limited to 8 Byte in state-of-the-art 64-bit processors. As a result, the pointer may be atomically modified. This, in conjunction to using the memory tier for retaining the tree data structure and reconstructing the volatile metadata information at mount, turns node CoW maintenance into a relatively efficient operation. Block-based file systems that support CoW may maintain the metadata in a block, which has to be replicated in order to change anything. The allocation of a node or data unit is also saved persistently and so does the node's reference counter. The allocation, new metadata node, and reference counter are updated in an atomic manner, such as using atomic operation, using a transaction, or the like. In some exemplary embodiments, another persistent write occurs to a journal, in case there is any malfunction between the time this process starts and ends, to avoid file system corruption if the process is interrupted.

Figure 2E:
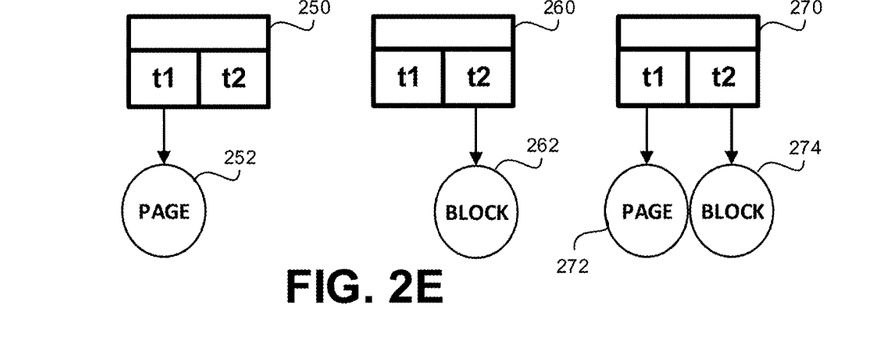
FIG. 2E shows a schematic illustration of a leaf node in a multi-tier file system, in accordance with some exemplary embodiment of the disclosed subject matter.

Referring now to FIG. 2E, showing a schematic illustration of a leaf node in a multi-tier file system, in accordance with some exemplary embodiment of the disclosed subject matter.

A leaf node, such as 250, points to a data unit retaining content in persistent storage. In a multi-tier file system having two tiers, Leaf Node 250 comprises two pointers to data units, one for tier one (t1) and the other for tier two (t2). Assuming t1 is persistent memory and t2 is block-based storage, t1 in Leaf Node 250 points to a page (252), while t2 in Leaf Node 250 points to a block (262). Each data unit has two logical pointers in the leaf element. The first is to the location in tier 1 (may be empty) the second is to a location in tier 2 (may be empty). In some cases, one tier or both may be used to retain the data. Both t1 and t2 may be used depending on the point in time and pressure on t1, data unit access patterns, prefetch heuristics, user hints, or the like. Leaf Node 250 exemplifies retaining data only in a page data unit (252). Leaf Node 260 exemplifies retaining data only in a block data unit (262). Leaf Node 270 exemplifies retaining the data in two duplicate copies: page data unit (272) and block data unit (274). Fixed contents, such as zeroes, may be further encoded as a flag within the Leaf Node (280), while both pointers are marked as invalid.

Figure 3A:
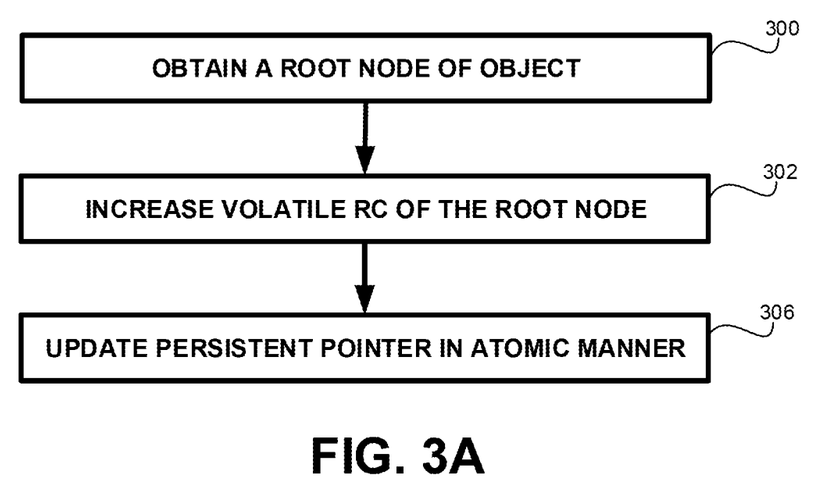
FIGS. 3A-3C show flowcharts of methods for creating and handling duplicate instances in a file system, in accordance with some exemplary embodiments of the disclosed subject matter.

Referring now to FIG. 3A, showing a flowchart of a method, in accordance with some exemplary embodiments of the disclosed subject matter.

On Step 300, a root node of an object is obtained. The root node may be a root node of an object that is being cloned. The root node may be the root node of a tree data structure used to represent the object.

On Step 302, the volatile Reference Counter (RC) of the root node is incremented. The volatile reference counter may be retained in the root node or in a different location and associated thereto. The incrementation may be performed without first taking a lock (e.g., by using an atomic instruction such as test-and-set or fetch-and-add) or otherwise employing a locking mechanism. Additionally or alternatively, the incrementation may be performed without been part of a transaction, which, if fails, rollbacks. In some cases, the incrementation is performed without writing to a persistent journal for recovery purposes.

On Step 306, a persistent pointer which is used as part of the tree data structure (e.g., a pointer to a node, such as a root node, a tree node, a leaf node, or the like) may be updated. The update may be performed in an atomic manner, such as using an atomic instruction. The update may be performed using an instruction to atomically set 8 Bytes used as the pointer. The atomic instruction may be performed without employing a locking mechanism, without being part of a transaction, without writing to a persistent journal for recovery purposes, or the like. The persistent pointer may be used to represent a new clone of the object, which is created and maintained using CoW scheme.

Figure 3B:
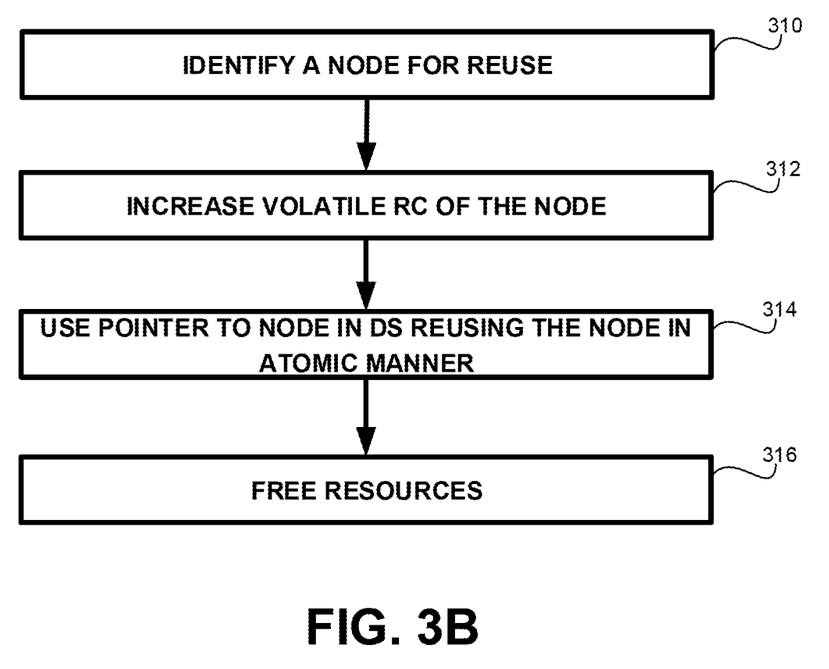

Referring now to FIG. 3B, showing a flowchart of a method, in accordance with some exemplary embodiments of the disclosed subject matter.

On Step 310, a node to be reused is identified. The node may be a node in a tree data structure representing an object. The node may be a root node, an internal node, a leaf node, or the like. The node may define a sub-tree beneath it that is to be reused for another object. In some exemplary embodiments, the node is identified as part of a de-duplication opportunity, thus an operation attempting to remove already existing identical (duplicated) data units and retain a single physical copy instead. In some cases, identical data units can be discovered within the same object itself, in which case Object 2, will be identical to 1 and different offsets within that object will share a physical copy.

As an example, consider FIG. 2C, and assume that Data Units 246*a*, 248*a* are identical to Data Units 246, 248, respectively. Such may occur, for example, in case the content of Object 2 202 is changed again to revert to the original content. Another scenario may be if two users downloaded the same object and made minor modifications thereof. A utility process may notice that the two objects are almost identical and this may issue a deduplication request. In such a case, the node that is to be re-used is Node 210, which will be re-used as Node 210*a* points to the same Nodes except for Node 214*a*, which differs from Node 214 only in view of the allegedly different Data Units 246*a*, 248*a*.

On Step 312, a volatile Reference Counter (RC) of the node is incremented. Step 312 may be similar to Step 302 above. In the example above, the volatile reference counter of Node 210 is incremented in anticipation to another pointer pointing thereto. The volatile reference counter is incremented outside of a transaction, without logging information in persistent journal, without obtaining a lock, or the like. In some cases, the volatile reference counter may be updated using a single instruction, which may be atomic by itself. However, Steps 312, 314 and 316 may not be performed together in an atomic manner.

On Step 314, the pointer to the node may be used in a data structure which re-uses the sub-tree. In some cases, the pointer may be a pointer in a pointing node that points to the node. The pointer may be modified using an atomic instruction. In the example above, the pointer of Object 2 202 is updated in an atomic instruction to point to Node 210 instead of to Node 210*a*. The modification of the pointer is made in persistent storage and such modification, if completed, will remain even if the process is interrupted, such as due to a power outage.

On Step 316, some resources may be freed. The resources may be resources that are no longer used in view of the modification performed on Step 314. Freeing resources may comprise updating the volatile metadata information. In some exemplary embodiments, the resources may be nodes or data units that are no longer being used, and can be indicated as free in the volatile resource usage collection. Referring again to the example above, after Object 2 202 is modified to point to Node 210, the volatile reference counter of Node 210*a* may be decremented and reach 0. As a result, Node 210*a* may be released and be freed for future allocation. Node 210*a* points to Nodes 212, 214*a*, 216. The volatile reference counter of each of which may be decremented as well. Out of the three nodes, only for Node 214*a*, the volatile reference counter reaches zero and the node is freed. Similarly, reference counters of the nodes pointed to by Node 214*a* are decremented, causing Node 224*a* to be released as well. As Node 224*a* points to Data Units 246*a*, 248*a*, such data units may also be released. In some cases, a reference counter for the data units may also be used and checked before release thereof.

In some exemplary embodiments, deduplication requests are in fact issued in order to release resources redundantly used by the operating system. Such redundant resources are released in Step 216.

Figure 3C:
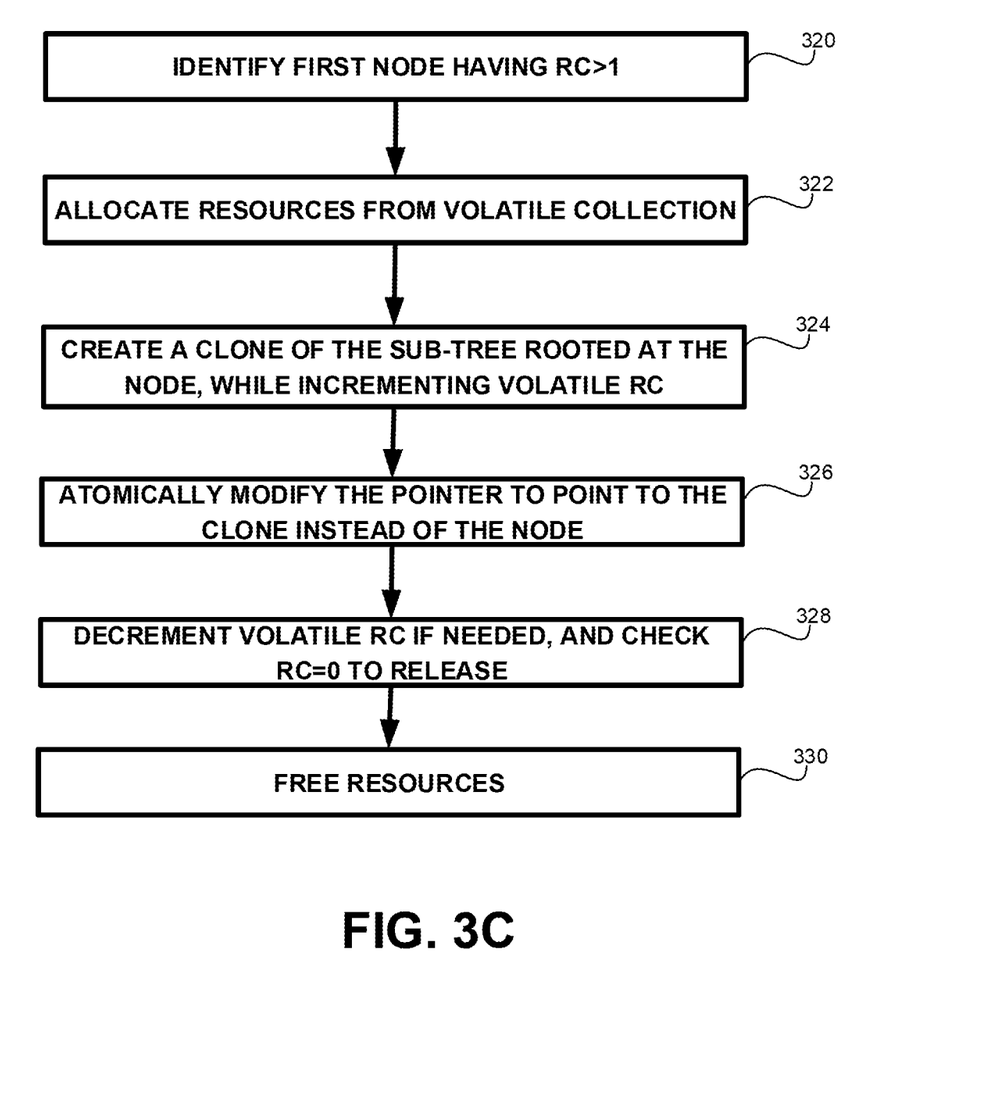

Referring now to FIG. 3C, showing a flowchart of a method, in accordance with some exemplary embodiments of the disclosed subject matter.

In case a data unit is about to be modified in an object, on Step 320, the tree data structure representing the object to be modified is traversed. A path from a root node to the leaf node pointing to the data unit is identified. In some cases, a path may be computed based on the offset and length of the data that is being written. Each node in the path may be checked until identifying a first node in the path having a volatile reference counter greater than one. If none exist than the data unit is not shared and can thus can just be modified, otherwise the first node (i.e., closest to the root node or furthest from the leaf node) having RC>1 may be cloned. The identified node is therefore used at least twice (e.g., by two or more objects or two or more offsets within the same object) to represent the same content. As the modification should affect only a single instance and not all instances using the identified node and sub-tree defined thereby, a CoW may be employed.

On Step 322, resources may be allocated from the volatile resource usage collection. The allocated resources may be nodes, data units, or the like, to be used for the creation of the clone.

On Step 324, a clone of the sub-tree rooted at the node may be created. A node may be allocated to be used in the clone sub-tree. The node may be set to point to other nodes, existing or newly allocated for the clone sub-tree. Before setting the pointers to each such node, the volatile reference counter of the pointed node may be incremented. In some exemplary embodiments, new nodes are allocated for the clone sub-tree to correspond the path starting at the node and ending in the leaf node pointing to the data unit being modified. Data units may also be allocated to represent the modified content and their content may be set. Additionally or alternatively, optimizations may be employed to avoid copying data if the data would be immediately erased when the modification is implemented.

In some exemplary embodiments, the steps prior to Step 326 may be considered as pre-processing steps, which are performed in preparation to modify the file system but without implementing any persistent modification thereof. Step 326, which follows, implements, using a single instruction, the change to the file system.

On Step 326, a pointer pointing to the sub-tree (e.g., pointing to the node identified on Step 320) may be modified to point to the cloned sub-path instead (e.g., to a replicate node of the node identified on Step 320). The pointer may be updated using an atomic instruction, without using locking mechanism, transaction, logging in persistent journal, or the like. After the modification, the data units to be modified are uniquely used and modification thereof would not affect other objects or offsets.

On Step 328, a volatile reference counter of the node is decremented. If the decremented value reaches zero, then the node is released, and the reference counters of all nodes pointed thereby are also decremented. Such operation may be performed repeatedly until no additional resources require to be released On Step 330, released resources may be handled and freed. In some cases, the volatile usage collection may be updated to re-include the released nodes and data units, so that such resources may be re-used in future operations.

Steps 328-330 may be considered as post-processing steps, that are performed after the file system has already implemented the change (e.g., Step 326). The post-processing steps may be performed with respect to volatile metadata information and may be performed in a section potentially subject to race condition, without taking a lock, without being part of a transaction, without using a journal, or the like.

It will be noted that Steps 322-330 may not be performed together in a single atomic operation, while each step on its own may be performed atomically or not, except for Step 326 in which atomicity is expressly required. For example, updating of a reference counter may be performed using a single atomic instruction.

It will be noted that any of Steps 322-330 may be performed with respect to any modification of the file system, and are not limited to the exemplary scenario described above.

Figure 4A:
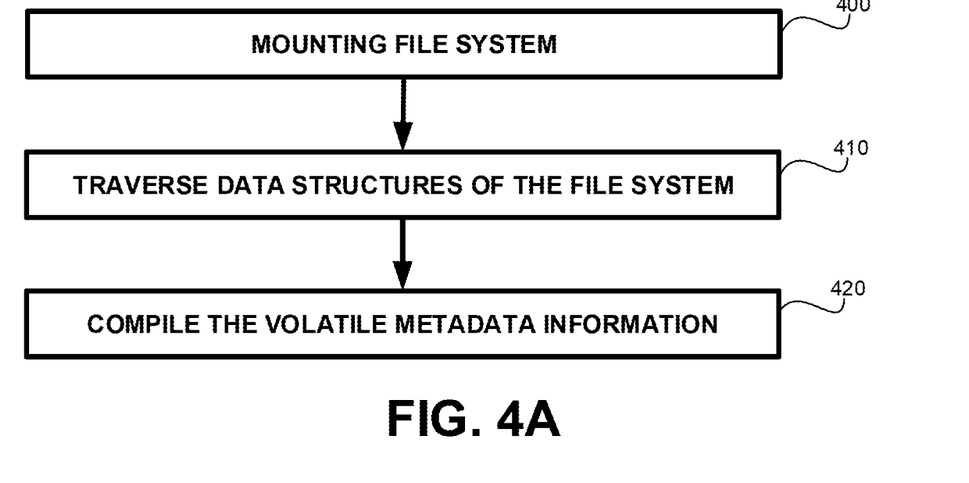
FIGS. 4A-4B show flowcharts of methods for handling volatile metadata information, in accordance with the disclosed subject matter.

Referring now to FIG. 4A showing a flowchart of a method for handling volatile metadata information, in accordance with the disclosed subject matter.

On Step 400, the file system is being mounted. The file system may be mounted in response to a user command. Additionally or alternatively, the file system may be mounted on boot-up.

On Step 410, data structures representing objects in the file system may be traversed. The traversal may allow to identify all data units and nodes that are currently being used by the file system to retain contents of file system objects and represent such objects. The data structures may be retained on addressable memory, such as in persistent memory, and as a result, the traversal may be relatively fast, as no block-access and copying of data to memory pages may be required. During a single pass traversal, both usage and the number of times each node is pointed at may be counted.

On Step 420, based on the traversal, volatile metadata information may be compiled. The volatile metadata information may comprise a volatile resource usage collection. In some exemplary embodiments, the resource usage collection may be a list of data units and nodes that are free and are not being used. The list of free data units and nodes may be used when the file system needs to allocate a new data unit. By retaining the list, the file system does not need to re-check free/allocated status of all data units and nodes after each operation which requires allocation of resources. The file system can utilize the collection identify a free resource in an efficient and fast manner. Additionally or alternatively, the resource usage collection may be a list of data units and nodes that are allocated and are used to retain content of objects or represent such objects. The list of allocated data units and nodes may be used to identify free data units and nodes in a similar manner. In some exemplary embodiments, the resource usage collection may comprise additional metadata on each data unit in addition to whether the data unit is free/allocated.

In some exemplary embodiments, the volatile metadata information may comprise volatile reference counters that are computed based on the traversal. Each time a node is reached, the volatile reference counter of such node may be incremented, thereby counting the number of times the node is being separately used.

Figure 4B:
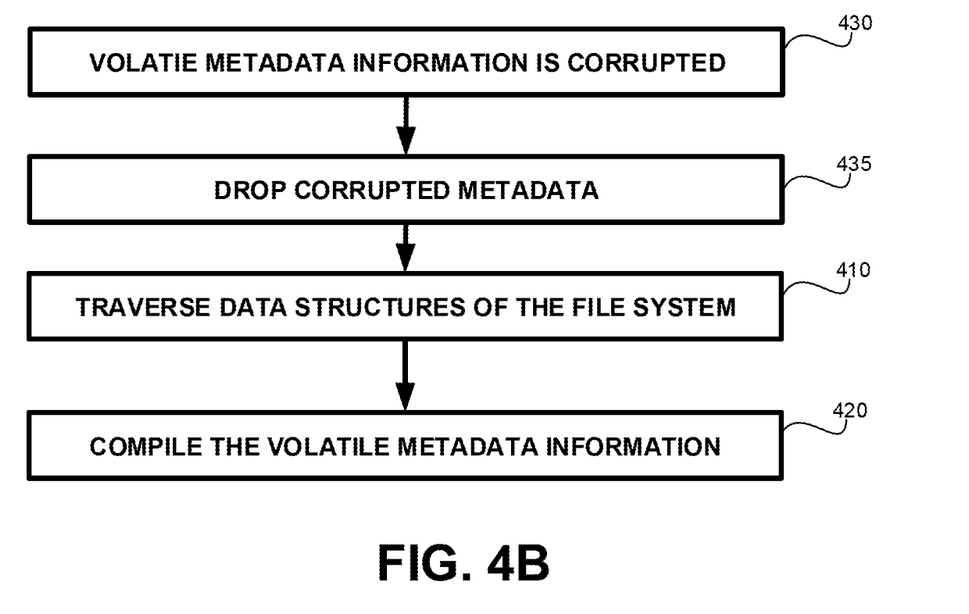

Referring now to FIG. 4B, showing a method in accordance with some exemplary embodiments of the disclosed subject matter.

On Step 430, the volatile metadata information is identified as being corrupted. As the metadata is volatile it may get corrupted during operation. The corruption may be identified if a reference counter becomes negative, if a resource usage collection is inaccessible, such as if the list does not exist, or the like. Additionally or alternatively, the corruption may be identified using any rule, and may be identified in an over-approximated manner which may include false positive indications of corruption when the collection is not corrupted.

On Step 435, the corrupted metadata information may be dropped, and thereafter, the metadata information may be re-compiled based on an explicit traversal of the file system data structures (410, 420)

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising:
   a non-transitory computer readable storage medium retaining program instructions for implementing a file system,
   wherein content of an object of the file system is retained in data units, a portion of the data units stored at a persistent memory that stores the file system,
   wherein the object is represented by a tree structure stored at the persistent memory with tree nodes and leaf nodes, the file system mapped to an address space of the persistent memory to directly access the tree structure and the portion of the data units;
   wherein each tree node points to another node of the tree structure and one of the leaf nodes points to at least one data unit used to retain content for the object;
   wherein the file system utilizes a volatile resource usage collection and volatile reference counters for tracking usage of each node of the tree structure;
   wherein said program instructions when executed by a processor, cause the processor to:
   in response to mounting the file system, scan the mapped address space of the persistent memory retaining file system metadata to compile the volatile resource usage collection indicating data units that are available for use and data units that are allocated by the file system to store content for the object, and the volatile reference counters associated with each used node of the tree structure indicating a number of nodes that reference each used node; and
   in response to a determination to reuse a pointed node of the tree structure by a pointing node:
      update a volatile reference counter of the pointed node in a single instruction without a lock;
      upon update of the volatile reference counter of the pointed node, atomically set, using a single instruction to point to the pointed node by the pointing node, without employing a lock and without using a transaction log by the file system; and
      free a node of the tree structure based on the reuse.

2. An apparatus comprising:
   a persistent storage retaining data units for storing content for an object used by a file system, wherein the object is represented by a tree structure with tree nodes and leaf nodes;

wherein each tree node points to another node of the tree structure and one of the leaf nodes points to at least one data unit used to retain content for the object wherein said persistent storage comprising a Byte-addressable persistent memory, wherein said Byte-addressable persistent memory is configured to retain at least a portion of the data units used by the file system, wherein said Byte-addressable persistent memory retaining the tree structure;

a processor, wherein said processor is configured to scan said Byte-addressable persistent memory to compile a volatile resource usage collection indicating data units that are available for use and data units that are allocated by the file system to store content for the object, and volatile reference counters of the nodes that track usage of each node of the tree structure;

wherein said processor is configured, in response to a determination to reuse a pointed node of the tree structure of the object by a pointing node, to:

update a volatile reference counter of the pointed node in a single instruction without a lock;

upon update of the volatile reference counter of the pointed node, atomically set, by a single instruction, the pointing node to point to the pointed node, without employing a lock and without using a transaction log by the file system; and free a node of the tree structure based on the reuse.

3. A method, comprising:

representing an object of a file system by a tree structure with tree nodes and leaf nodes stored at a persistent memory;

wherein content of an object used by the file system is retained in data units, a portion of the data units stored at the persistent memory with the file system;

wherein each tree node points to another node of the tree structure and one of the leaf nodes points to at least one data unit associated with the object;

wherein the file system is mapped to an address space of the persistent memory to directly access the tree structure and the portion of the data units wherein the file system utilizes a volatile resource usage collection and volatile reference counters for tracking usage of each node of the tree structure;

in response to mounting the file system, scanning the mapped address space of the persistent memory retaining file system metadata to compile the volatile resource usage collection for indicating data units that are available for use and data units that are allocated by the file system to store content for the object, and the volatile reference counters associated with each used node of the tree structure indicating a number of nodes that reference each used node; and in response to a determination to reuse a pointed node of the tree structure by a pointing node:

updating a volatile reference counter of the pointed node;

upon updating a volatile reference counter, atomically setting, using a single instruction to point to the pointed node by the pointing node, without employing a lock and without using a transaction log by the file system;

freeing a node of the tree structure based on the reuse.

4. The computer program product of claim 1, wherein at least a portion of the data units are memory pages retained in the persistent memory that is Byte-addressable.

5. The computer program product of claim 1, wherein the volatile resource usage collection comprises a list of data units associated with the file system that are unallocated and allocated.

6. The computer program product of claim 1, wherein said program instruction, further cause the processor to:

in response to an instruction to modify a content of a second object of the file system:

compute a path in the tree structure of the second object to update the content;

identify a second pointed node in the path having a volatile reference counter with a value greater than one, wherein a second pointing node points to the second pointed node, whereby identifying a sub-tree rooted at the second pointed node;

create a clone sub-tree of the sub-tree;

upon creating the clone sub-tree, atomically modify, using a single instruction, the second pointing node to point to a first node of the clone sub-tree instead of pointing to the second pointed node; and update the volatile reference counter of the second pointed node to decrease by one.

7. The computer program product of claim 1, wherein said updating the volatile reference counter and said atomically setting the pointing node are executed separately in separate atomic operations.

8. The apparatus of claim 2, wherein said atomically setting is performed using a single atomic instruction in an instruction set of said processor.

9. The apparatus of claim 2, wherein said persistent storage comprises a second storage device, wherein the file system is a multi-tier file system comprising a first tier and a second tier, wherein the first tier is retained in said Byte-addressable persistent memory, wherein the second tier is retained in said second storage device.

10. The apparatus of claim 2, wherein the volatile resource usage collection comprises a list of data units or nodes associated with the file system that are unallocated.

11. The apparatus of claim 2, wherein the volatile resource usage collection comprises a list of data units or nodes associated with the file system that are allocated.

12. The apparatus of claim 2, wherein said processor is configured, in response to an instruction to modify a content of a second object, to:

compute a path in the tree structure of the second object to update the content;

identify a second pointed node in the path having a volatile reference counter with a value greater than one, wherein a second pointing node points to the second pointed node, and a sub-tree rooted at the second pointed is identified;

create a clone sub-tree of the sub-tree;

upon creating the clone sub-tree, atomically modify, using a single instruction, the second pointing node to point to a first node of the clone sub-tree instead of pointing to the second pointed node; and update the volatile reference counter of the second pointed node to decrease by one.

13. The method of claim 3, wherein at least a portion of the data units are memory pages retained in the persistent memory that is Byte-addressable.

14. The computer program product of claim 4, wherein the file system is a multi-tier file system comprising a first tier and a second tier, wherein the first tier is retained in the Byte-addressable persistent memory, wherein the second tier is a different storage from the Byte-addressable persistent memory.

15. The apparatus of claim 9, wherein said second storage device is a block-based storage device.

16. The method of claim 13, wherein the file system is a multi-tier file system comprising a first tier and a second tier, wherein the first tier is retained in the Byte-addressable persistent memory, wherein the second tier is retained in a different storage from the Byte-addressable persistent memory.

17. The method of claim 13, wherein the volatile resource usage collection comprises a list of data units associated with the file system that are unallocated and allocated to store content for the object.

18. The method of claim 13, further comprising:

in response to an instruction to modify a content of a second object of the file system:

computing a path in the tree structure of the second object to update the content;

identifying a second pointed node in the path having a volatile reference counter with a value greater than one, wherein a second pointing node points to the second pointed node for identifying a sub-tree rooted at the second pointed node;

creating a clone sub-tree of the sub-tree;

upon creating the clone sub-tree, atomically modifying using a single instruction, the second pointing node to point to a first node of the clone sub-tree instead of pointing to the second pointed node; and updating the volatile reference counter of the second pointed node to decrease by one.

19. The method of claim 13, wherein the tree structure is an inode data structure stored at the persistent memory with the file system.

20. The method of claim 16, wherein the different storage is a block-based storage device.

\* \* \* \* \*